(12) United States Patent
Kau

(10) Patent No.: US 6,805,039 B2
(45) Date of Patent: Oct. 19, 2004

(54) OIL PRESSURE CYLINDER WITH PROLONGED ADJUSTING RING

(76) Inventor: Jong-Jyr Kau, No. 19, Lane 387, Ming-An Rd., Shin Chuang City, Taipei (TW)

( * ) Notice: Subject to any disclaimer, the term of this patent is extended or adjusted under 35 U.S.C. 154(b) by 9 days.

(21) Appl. No.: 10/298,124

(22) Filed: Nov. 14, 2002

(65) Prior Publication Data

US 2004/0094033 A1 May 20, 2004

(51) Int. Cl.[7] ............................................... F01B 11/03
(52) U.S. Cl. ........................................ 92/169.1; 92/164
(58) Field of Search ................................. 92/164, 169.2

(56) References Cited

U.S. PATENT DOCUMENTS 6,076,814 A * 6/2000 Grundei ..................... 267/221

6,443,271 B2 * 9/2002 Schmidt ..................... 188/285

* cited by examiner

*Primary Examiner*—Edward K. Look
*Assistant Examiner*—Michael Leslie
(74) *Attorney, Agent, or Firm*—Pro-Techtor International Services (57) ABSTRACT

An oil pressure cylinder has an adjusting ring. The adjusting ring is prolonged and is formed by two parts which are buckled with one another. An elastic element is used to buckle the adjusting ring. A spring is embedded at a slot of the adjusting ring so as to tightly seal the adjusting ring. The sealing washer in the steel tube has a plane shape and has a convex ring. An outer side of the convex ring is enclosed by an elastic wearing compensating spring; a connecting portion of the selecting seat with the adjusting ring is formed as a plane for matching the plane sealing washer. The adjusting ring is formed integrally, the adjusting ring has an opening, the opening has two parallel long sides and two parallel short sides, four corners of the opening are cambered; in interior of the adjusting ring has a plurality of blocks.

2 Claims, 10 Drawing Sheets

Fig. 1

Prior Art

Fig. 2

Prior Art

Fig. 3

Prior Art

OIL PRESSURE CYLINDER WITH PROLONGED ADJUSTING RING

FIELD OF THE INVENTION

The present invention relates to oil pressure cylinders, and particularly to an oil pressure cylinder having a well defined adjusting ring which is prolonged so as to provide a larger torque to assist the work of rotation.

BACKGROUND OF THE INVENTION

Oil pressure cylinders serve to provide shock-proof ability or resistance to other devices. However, for a long using time, it is often the parts within a oil pressure cylinder are worn out so that the sealing washer can not effectively prevent the drainage of oil. Therefore, an adjusting ring is designed. The adjusting ring is engaged to a control portion of the oil pressure cylinder.

Figure 1:
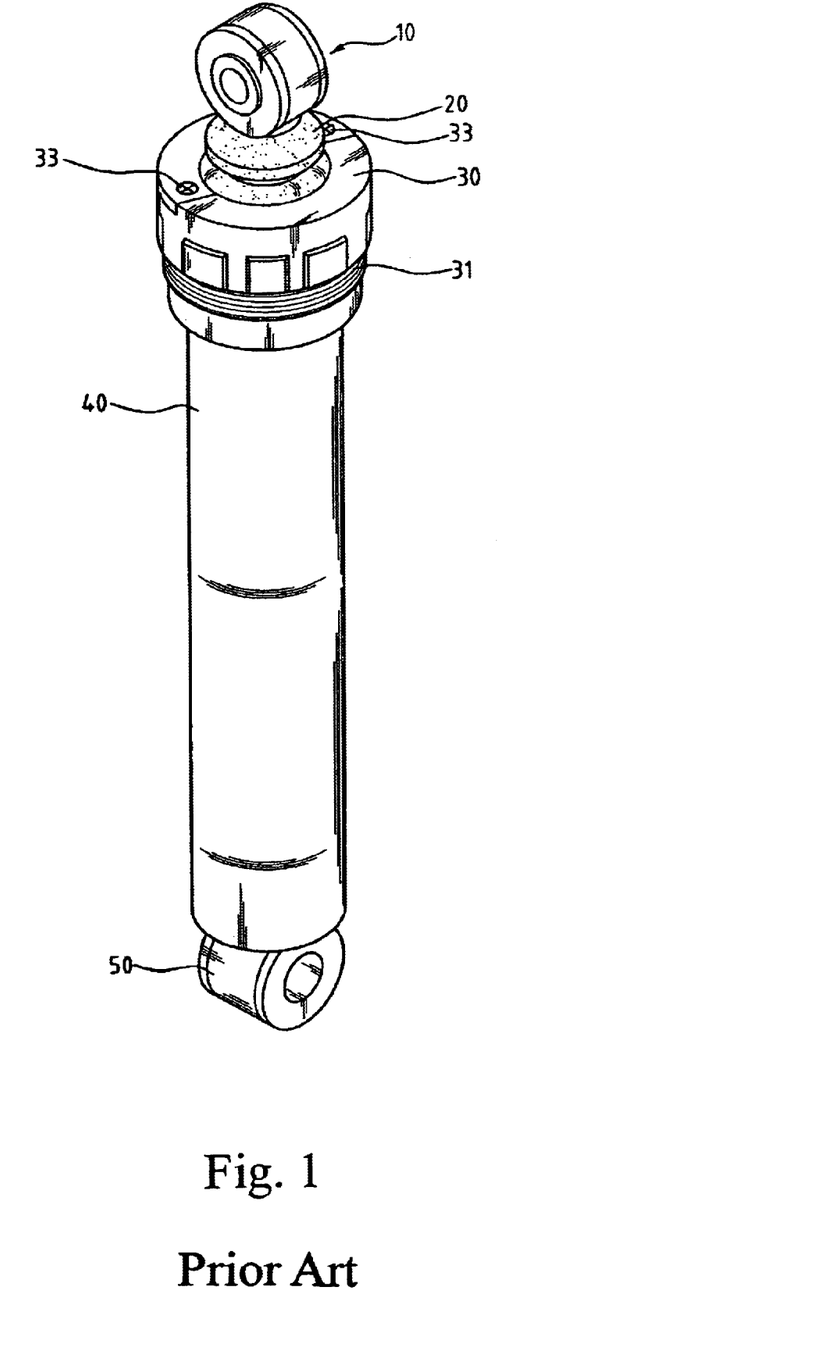
FIG. 1 is a perspective view of a prior art oil pressure cylinder.

With reference to FIG. 1, a prior art adjusting ring is illustrated. the adjusting ring is mainly formed by an operation rod 10, a buffer washer 20, an adjusting ring 30. An outer side of the adjusting ring 30 has a spring 31. A lower half of the adjusting ring 30 is connected to an outer tube 40. A lower end of the outer tube 40 is connected to a fixing rod 50.

From the drawing, it is appreciated that the adjusting ring 30 is formed by two shorter portions. A metal spring 31 is tightly buckled to screws 33 on the screw holes 32 at the upper end of the adjusting ring 30.

However, when the oil pressure cylinder is used, it is often that the length of the adjusting ring 30 is insufficient so as to affect the work. Moreover, referring to FIG. 2, an exploded view of a prior art oil pressure cylinder is illustrated. It is shown that the oil pressure cylinder is formed by an operation rod 10, a buffer pad 20, a pressure adjusting ring 30, a spring 31, a steel tube 60, a dust-proof washer 61, a selecting seat 62, a sealing washer 63, a piece washer 64, a spring 65, a support seat 66, and an oil circuit adjusting seat 67. A set of buffer device 70 is installed after the above said components. The buffer device 70 has a nut 71 which is screwed with a threaded portion of the inner tube 80 at a distal end of the operation rod. At this assembly (with reference to the cross sectional view of FIG. 3), when the sealing washer in the steel tube 60 is combined to the selecting seat, the combining surface of the selecting seat 62 is an inclined surface for matching the inclined surface in the selecting seat 62. Thereby, the sealing washer 63 and the selecting seat 621 are contact to one another by the inclined surface for sealing the pressurized oil in the tube. When the operation rod 10 extends and contracts reciprocally under a pressure, oil will drain out from the inclined surfaces. For a longer time, the sealing washer 63 will lose of functions. Thereby, the prior art is necessary to be improved.

SUMMARY OF THE INVENTION

Accordingly, the primary object of the present invention is to provide an oil pressure cylinder comprising an operation rod, a buffer washer, an adjusting ring, a rubber ring, an outer tube and a fixing rod; an interior of the oil pressure comprising a steel tube, a dust-proof washer, a selecting seat, a sealing washer, a washer piece, a spring, a support seat and an oil circuit adjusting seat; and a spring, a support seat and an oil circuit adjusting seat; and a buffer device.

The adjusting ring is prolonged and is formed by two parts which are buckled with one another. An elastic element is used to buckle the adjusting ring. The spring is embedded at a slot at an outer side of the adjusting ring so as to tightly seal the adjusting ring. The sealing washer in the steel tube has a plane shape and has a convex ring. An outer side of the convex ring is enclosed by an elastic wearing compensating spring; a connecting portion of the selecting seat with the adjusting ring is formed as a plane for matching the plane sealing washer.

Moreover, in the present invention, the adjusting ring is formed integrally, the adjusting ring has an opening, the opening has two parallel long sides and two parallel short sides, four corners of the opening are cambered; in interior of the adjusting ring has a plurality of blocks.

The various objects and advantages of the present invention will be more readily understood from the following detailed description when read in conjunction with the appended drawing.

DETAILED DESCRIPTION OF THE PREFERRED EMBODIMENTS

The adjusting ring 35 of the present invention is apparently different from the adjusting ring 30 of the prior art in length. Other than a longer length, the outer side of the adjusting ring 35 of the present invention has a rubber ring 34 at an outer side trench 351 for tightening the adjusting ring 35. Moreover, a distal end of the adjusting ring 35 is adhered with sticky paper 36 having scales thereon for indicating the pressure values adjustable.

Figure 2:
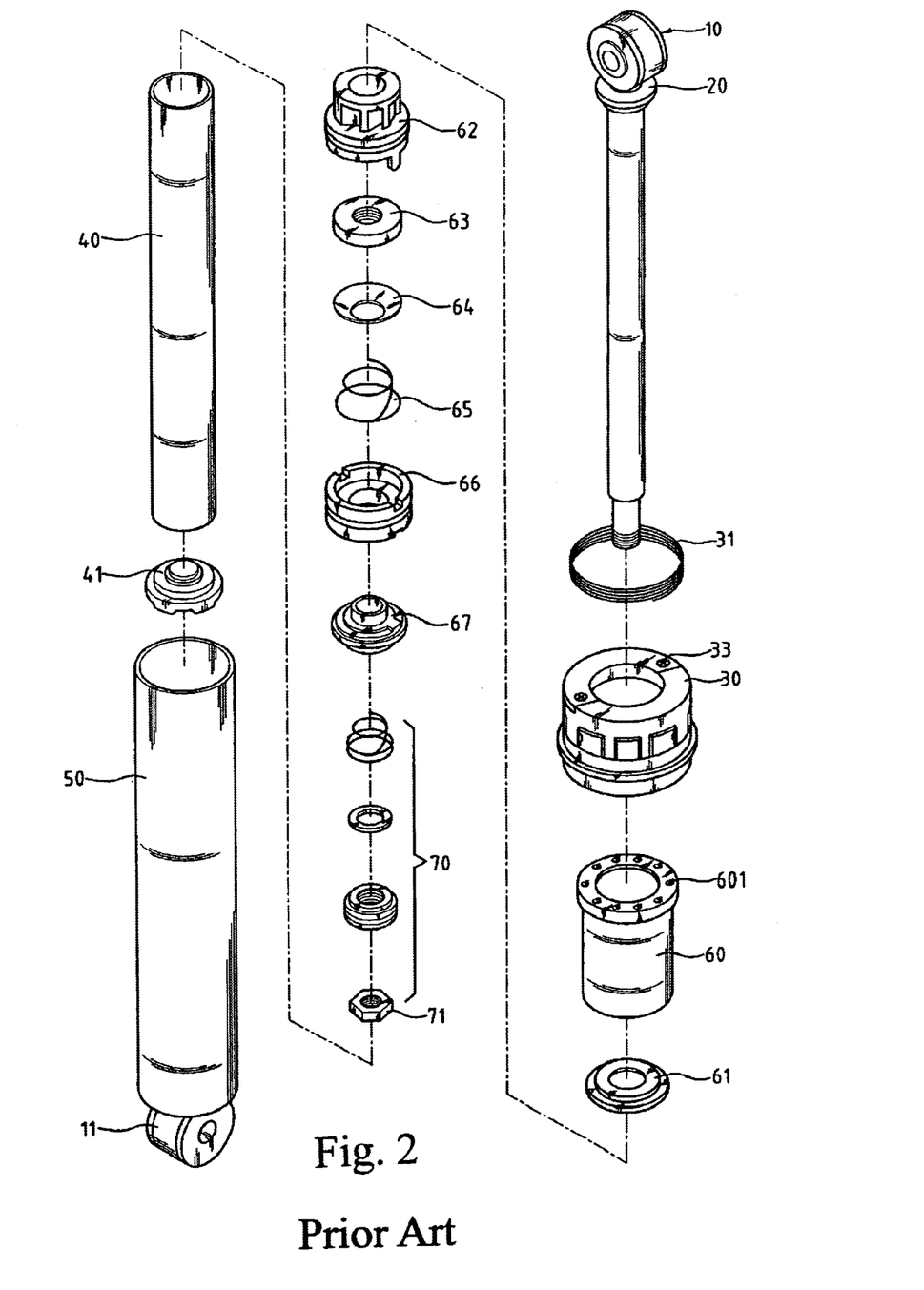
FIG. 2 is an exploded perspective view of the prior art oil pressure cylinder.
Figure 3:
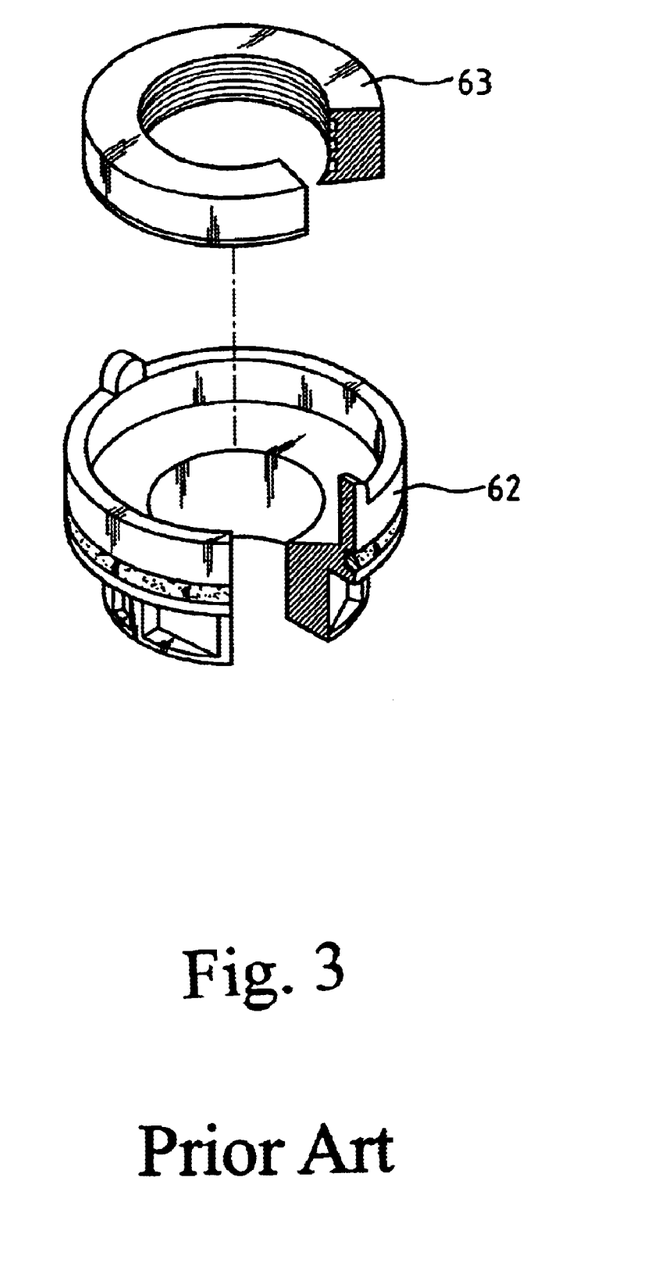
FIG. 3 is a cross sectional view showing a sealing washer of a prior art oil pressure cylinder.
Figure 4:
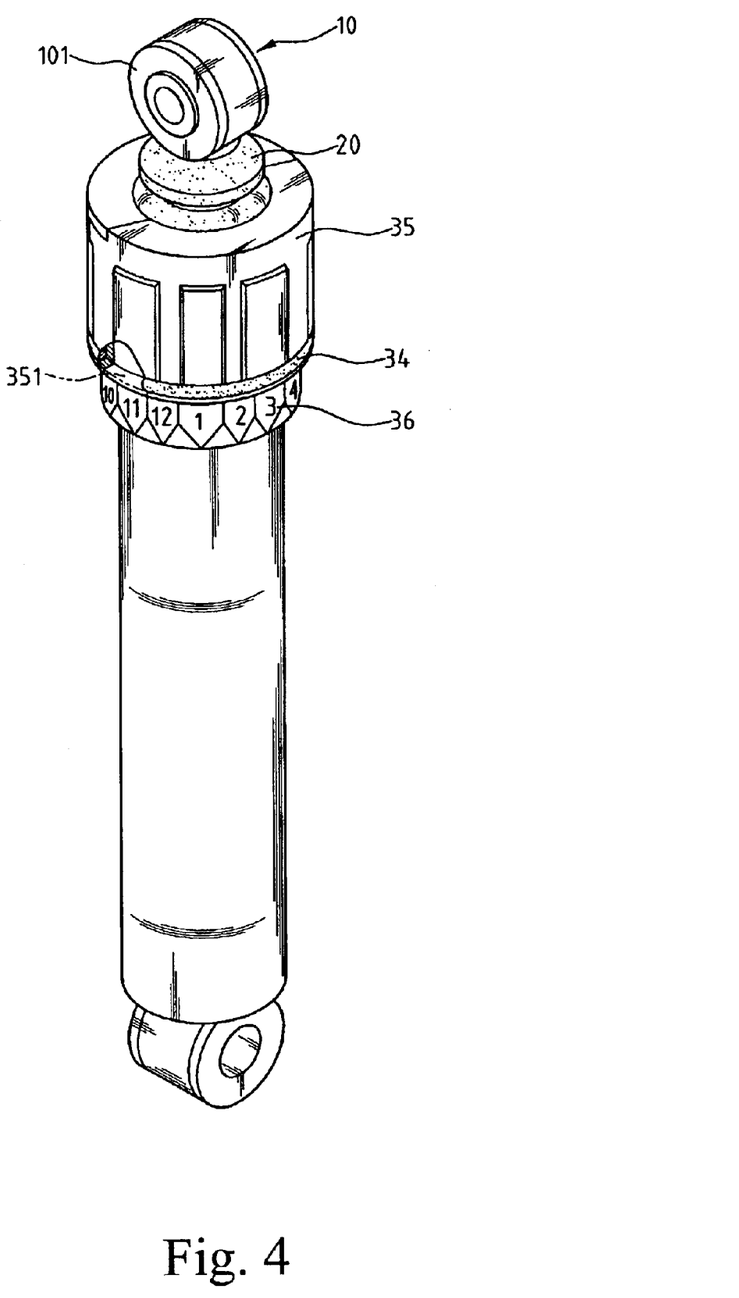
FIG. 4 is a perspective view of the present invention.
Figure 5:
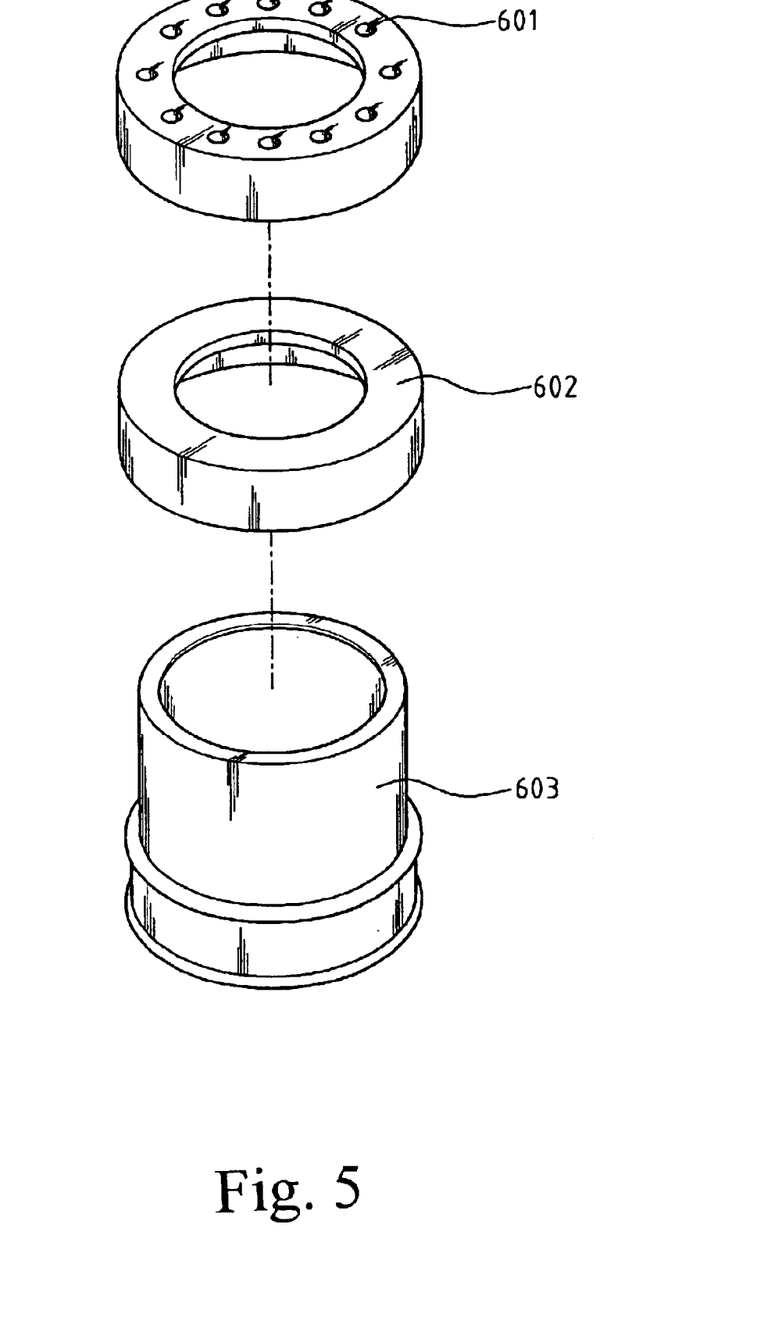
FIG. 5 shows one embodiment of the steel tube of the present invention.

Referring to FIGS. 4 and 5, the steel tube 60 is made by lathe and then by forging so as to form as an integral steel tube 60. However, this way needs a high cost and can not be mass-produced. Therefore, at one embodiment of the present invention, the steel tube 60 is made by pressing punching to be as a top cover 602 and a cylinder body 603. Then the top cover 602 and cylinder body 603 are formed as an integral body by pressure fitting. The steel tube 60 made by this way is as that illustrated in FIG. 2 and have the same effect as that in FIG. 2, but the cost is lowered. Otherwise, it is shown in FIG. 2, in the prior art, the top cover 602 of the steel tube 60 of the present invention has a groove 601 for receiving steel balls (referring to FIG. 2), but the cost is high. In the present invention, the top cover 602 of steel tube 60 of the present invention has no groove 601 for saving cost and labor.

Figure 6:
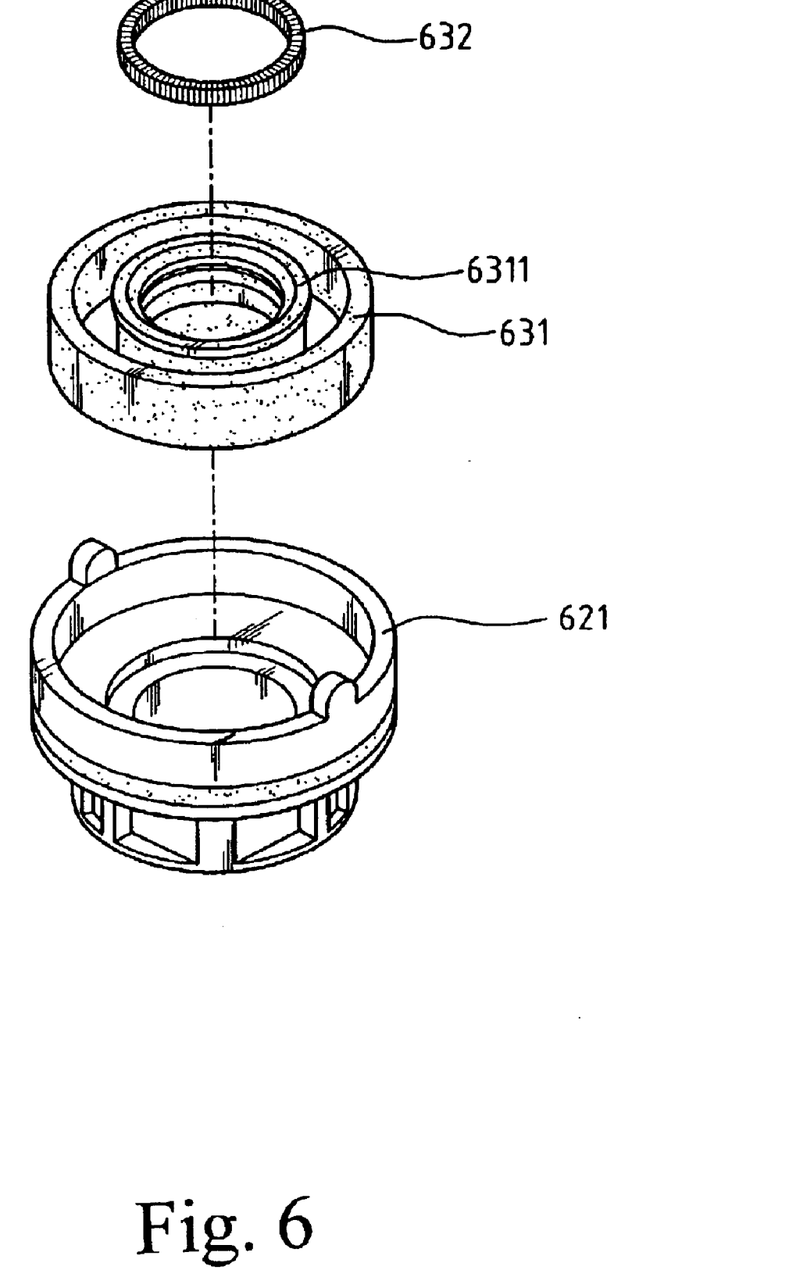
FIG. 6 is a perspective view of the sealing washer of the present invention.

Referring to FIG. 6, a perspective view of the sealing washer 631 of the present invention is illustrated. It is illustrated that the sealing washer 631 of the present invention and a matched selecting seat 621 is different from those in the prior art. In the prior art, when a sealing washer 63 and a selecting seat 62, an inclined surface formed can not satisfy the operation for a longer time. Therefore, referring to FIG. 3, in the prior art, the inclined surface by molding the selecting seat 62 is not made with the inclined surface of the prior art sealing washer 63. Thus, when the two inclined surfaces are used to seal oil circuit. The two inclined surface can be connected tightly and thus the tightness and pressure can not distributed uniformly. As a result, the selecting seat 62 is worn greatly and the lifetime of the oil cylinder will be shortened. Thereby, in the present invention, when the selecting seat 621 is lathed. The contact surfaces of the selecting seat 621 and the sealing washer 631 are modified as a plane as shown in the figure. In this way, since the sealing washer 631 and selecting seat 621 are lathed at the same time, and thus the two have better concentricity. When the operation rod 10 moves upwards and downwards, the pressure can be distributed uniformly. Moreover, a ring 6311 is installed in the sealing washer 631 of the present invention. The ring 6311 serves for receiving a spring 632. As a result, the sealing washer 631 of the present invention can move reciprocally under pressure while the sealing oil pressure can be retained.

Figure 7:
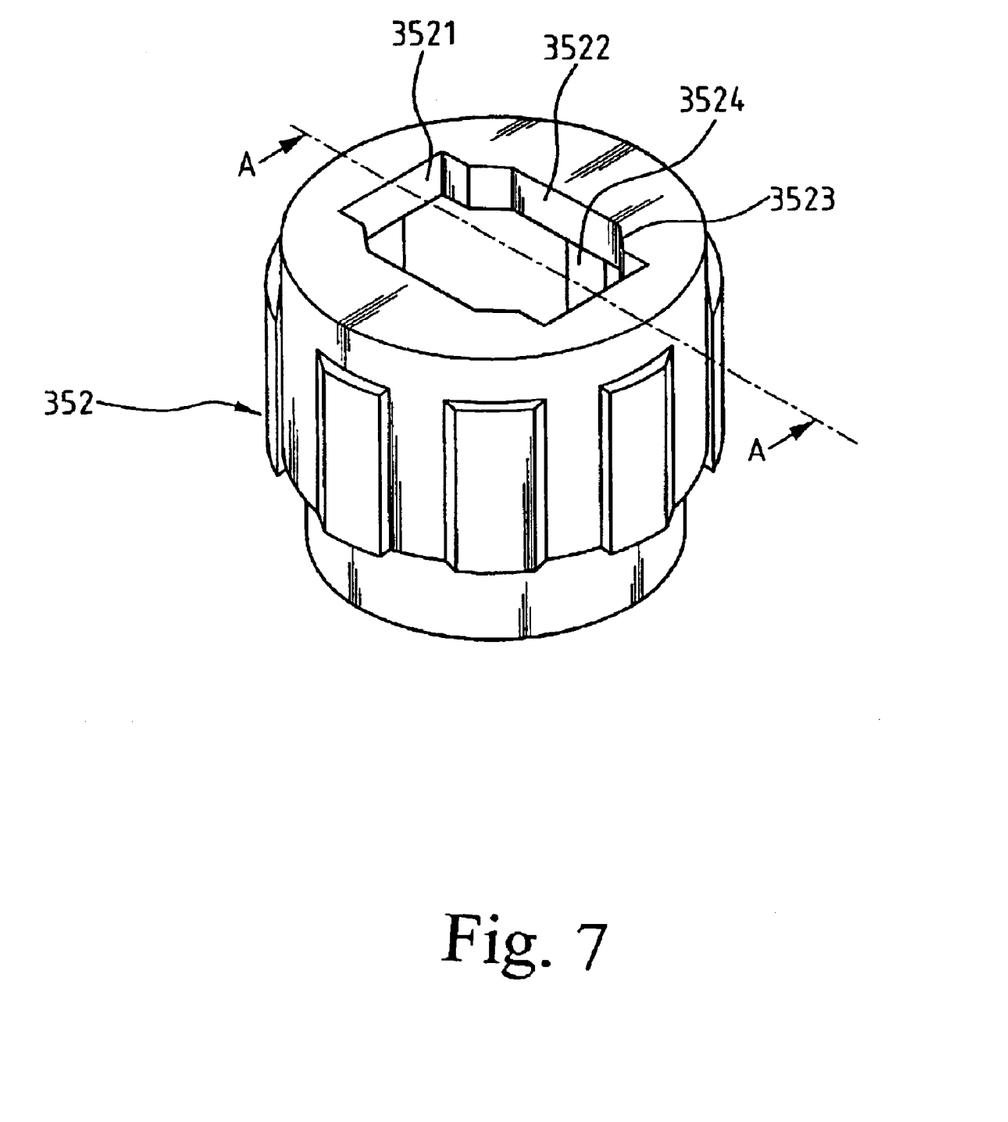
FIG. 7 shows another embodiment of the adjusting ring of the present invention.
Figure 8:
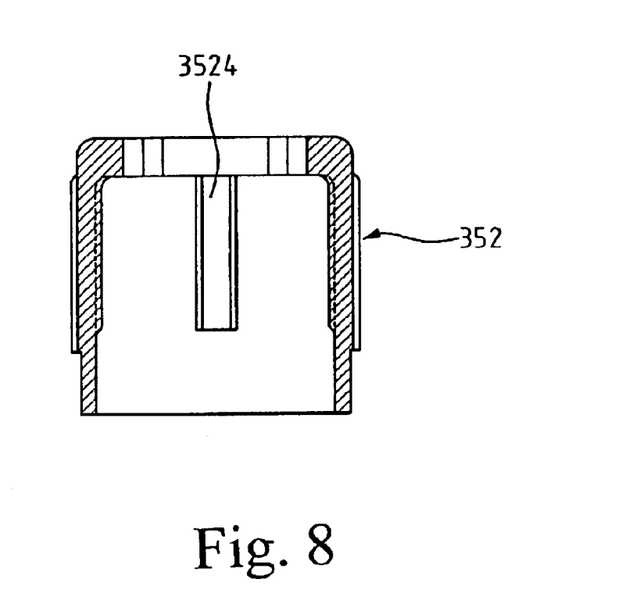
FIG. 8 is a cross sectional view along line A—A of FIG. 7.
Figure 9:
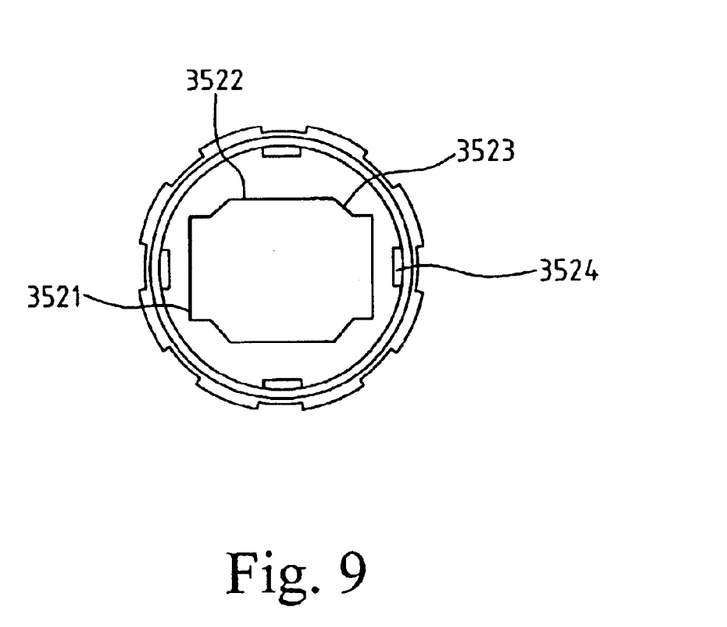
FIG. 9 is a view of the adjusting ring in the FIG. 7.

Referring to FIG. 7, a perspective view of the adjusting ring 352. It is shown that the adjusting ring 35 is longer than that of the prior art. A center of the adjusting ring 352 is formed with an angled opening with a width side 3521, a thin side 3522 and a cambered side 3523. The object of the adjusting ring 352 is to engage with the operation rod 10. A ring 101 at an upper end of the operation rod 101 can pass through the cambered side 3523 of the adjusting ring 352. Referring to FIGS. 8 and 9, the cross sectional view and end view of the adjusting ring 352 are illustrated. The interior of the adjusting ring 352 has four blocks 3524 which are uniformly distributed on an inner periphery of the adjusting ring 352.

Figure 10:
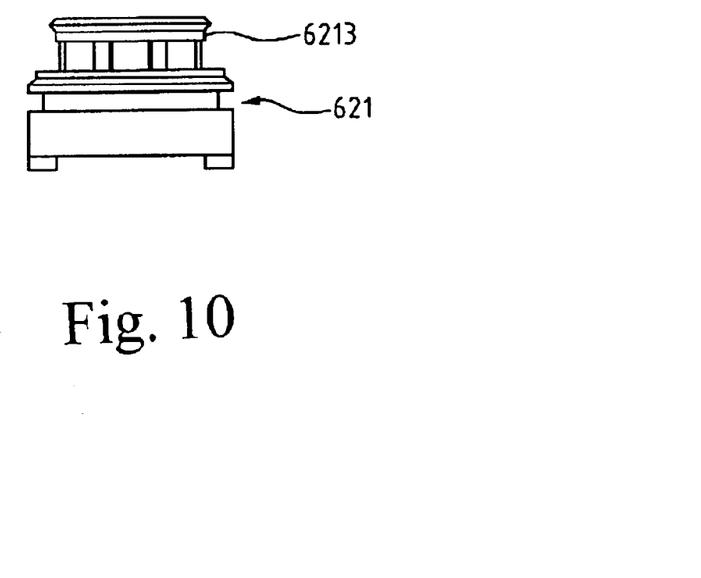
FIG. 10 is a cross sectional view of the selecting seat of FIG. 10.
Figure 11:
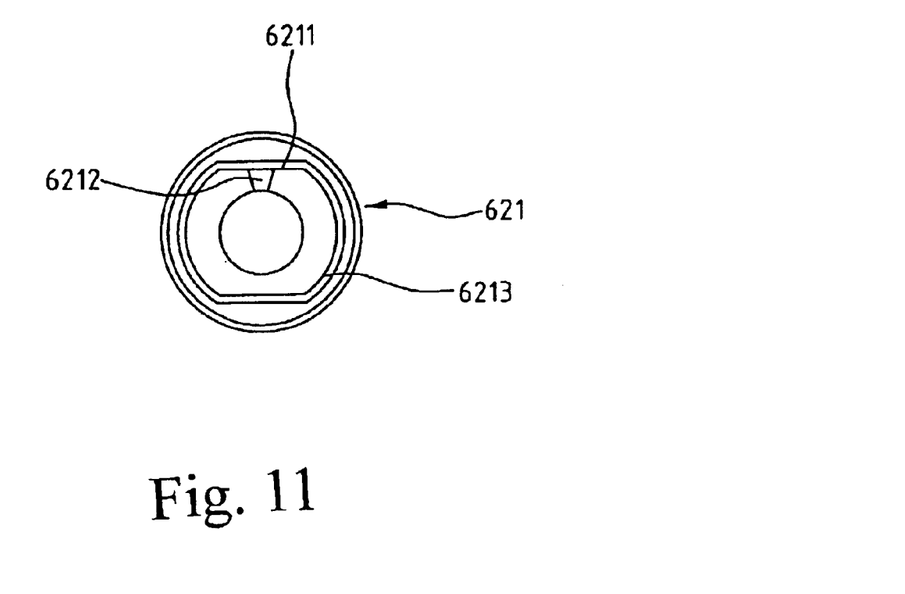
FIG. 11 is a side view of the selecting seat of FIG. 10.

With reference to FIGS. 10 and 11, it is shown that other than the improvement shown in FIG. 6, the selecting seat 621 is improved. A top of the selecting seat 621 has a plane 6211. The plane 6211 has a slot 6212 for increasing the elasticity thereof. The shape of the plane 6211 is matched to the thin side 3522 of the adjusting ring 352. Thus selecting seat 621 can pass through the adjusting ring 352. A ring hook 6213 is added at a top of the selecting seat 621. When the selecting seat 621 passes through the adjusting ring 352, due to the slot 6212 on the plane 6211 of the selecting seat 621, when the selecting seat 621 passes through the adjusting ring 352, the outer edge of the ring hook 6213 will touch a bottom of the adjusting ring 352, the selecting seat 621 will be intruded inwards due to the gap of the slot 6212. After the selecting seat 621 has passed through the adjusting ring 352, the selecting seat 621 is ejected out due to the resilient force and an outer edge of the ring hook will buckle the outer edge of the adjusting ring 352.

Figure 12:
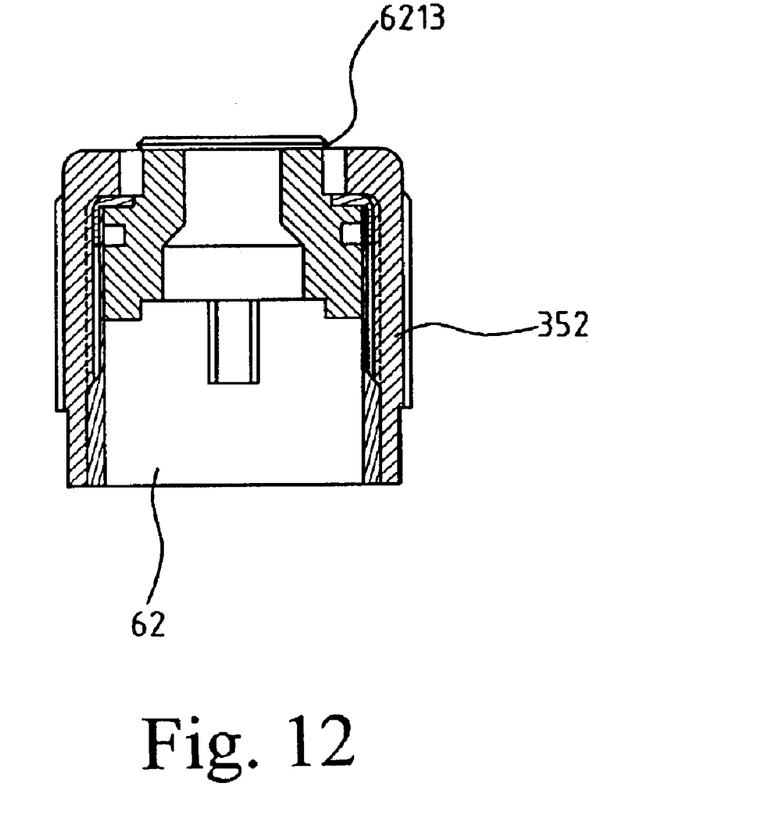
FIG. 12 is a cross sectional view showing the combination of the adjusting ring and selecting seat.

Referring to FIG. 12, a cross sectional view is illustrated. In the figure, the selecting seat 621 is combined to the adjusting ring 35, the outlook of the adjusting ring 352 has been modified. No top cover 602 of the steel tube 60 is necessary. After combination, the selecting seat 621 will be ejected out due to the action of the slot 6212 and then is buckled to the plane of the adjusting ring 352.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An oil pressure cylinder comprising:

an operation rod, a buffer washer, an adjusting ring, a rubber ring, an outer tube, a fixing rod, a steel tube, a dust-proof washer, a selecting seat, a sealing washer, a washer piece, a spring, a support seat, and an oil circuit adjusting seat positioned in an interior of said oil pressure cylinder, and a buffer device; wherein said adjusting ring is formed by two parts connected by an elastic element, said spring is secured in a slot at an outer side of said adjusting ring so as to tightly seal said adjusting ring, said sealing washer in said steel tube has a plane shape with a convex ring, an outer side of said convex ring being enclosed by an elastic wear compensation spring, a connecting portion of said selecting seat and said adjusting ring is formed as a plane conforming to said plane shape of said sealing washer.

2. The oil pressure cylinder as claimed in claim 1, wherein:

said steel tube is formed by press punching a top cover and a cylinder body, said top cover and said cylinder body then being formed into an integral body by pressure fitting.

* * * * *